(12) United States Patent
Eskicioglu

(10) Patent No.: US 6,409,089 B1
(45) Date of Patent: Jun. 25, 2002

(54) METHOD FOR PROTECTING THE AUDIO/VISUAL DATA ACROSS THE NRSS INTERFACE

(75) Inventor: Ahmet Mursit Eskicioglu, Indianapolis, IN (US)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/581,276

(22) PCT Filed: Dec. 10, 1998

(86) PCT No.: PCT/US98/26296
§ 371 (c)(1),
(2), (4) Date: Mar. 13, 2001

(87) PCT Pub. No.: WO99/30499

PCT Pub. Date: Jun. 17, 1999

Related U.S. Application Data

(60) Provisional application No. 60/069,090, filed on Dec. 10, 1997, and provisional application No. 60/086,567, filed on May 21, 1998.

(51) Int. Cl.[7] .............................................. G06K 19/06
(52) U.S. Cl. ...................................... 235/492; 235/380
(58) Field of Search ................................. 235/382, 492; 380/10; 375/200; 455/2

(56) References Cited

U.S. PATENT DOCUMENTS

| | | | |
|---|---|---|---|
| 4,694,489 A | 9/1987 | Frederiksen | 380/10 |
| 5,758,257 A | 5/1998 | Herz et al. | 455/2 |
| 5,878,134 A | 3/1999 | Handelman et al. | 235/382 |
| 6,009,116 A | 12/1999 | Bednarek et al. | 375/200 |
| 6,035,037 A | 3/2000 | Chaney | 380/10 |

FOREIGN PATENT DOCUMENTS

| | | | |
|---|---|---|---|
| EP | 658054 | 6/1995 | H04N/7/16 |
| EP | 714204 | 5/1996 | H04N/5/913 |
| WO | 96/06504 | 2/1996 | H04N/7/167 |
| WO | WO-96/32702 | 10/1996 | G07F/7/10 |

*Primary Examiner*—Karl D. Frech
*Assistant Examiner*—Ahshik Kim
(74) *Attorney, Agent, or Firm*—J. S. Tripoli; D. T. Shoneman; R. D. Shedd

(57) ABSTRACT

A system for enhancing the security of the interface between a consumer electronic device and a removable security device is provided by protecting the audio/visual (A/V) stream descrambled in the removable security device. The protection involves dynamically computing a shared key followed by the rescrambling of the A/V stream.

19 Claims, 1 Drawing Sheet

METHOD FOR PROTECTING THE AUDIO/VISUAL DATA ACROSS THE NRSS INTERFACE

This application claims benefit of Provisional applications No. 60/069,090, filed Dec. 10, 1997 and No. 60/086,567 filed May 21, 1998.

FIELD OF THE INVENTION

This invention concerns a system for enhancing the security of the interface between a consumer electronic device and a removable security device such as the interface defined by the National Renewable Security Standard (NRSS). Security is enhanced by protecting the audio/visual (A/V) stream that is descrambled by the removable security device, such as a smart card, coupled to the consumer electronic device. Examples of consumer electronic devices employing the NRSS smart cards include digital television receivers, digital video cassette recorders as well as separate devices or "boxes" that may be located on top of, or coupled to, a television receiver, i.e., set-top boxes.

BACKGROUND OF THE INVENTION

A concern of today's emerging digital consumer electronic products is the ability to access a plaintext (i.e., in-the-clear) digital bitstream thereby permitting one to make unauthorized digital copies of the bitstream. The National Renewable Security Standard (NRSS) (EIA-679) developed by the Electronic Industries Alliance provides a means for employing renewable security in connection with digital consumer electronics (CE) devices, for example, digital television receivers, digital video cassette recorders and set-top boxes. Renewable security allows for the development of conditional access systems that can be replaced, upgraded or recovered with minimum cost and effort.

Typically, a service provider will scramble (or encrypt) the signal before it is transmitted or broadcast. A conditional access (CA) device (e.g., an NRSS smart card) may be used to descramble (or decrypt) the signal and route it to the host device. However, a problem with the NRSS architecture is that the audio/visual (A/V) stream is sent to the host device (for example, a display device or a set top box) from the smart card in-the-clear. That is, the A/V stream is not scrambled when it leaves the CA device. Thus a person can monitor this line and use a data capturing device to record all the data.

SUMMARY OF THE INVENTION

This invention resides, in part, in recognition of the described problem and, in part, in providing a solution to the problem. Generally, the present invention defines a method for protecting the output audio/visual (A/V) stream of a smart card by receiving a scrambled signal from a source external to said smart card, generating a descrambling key in response to said received signal, descrambling said received signal using said descrambling key to generate a descrambled signal, receiving data from said external source, generating a scrambling key in response to said received data, scrambling said descrambled signal using said scrambling key to generate a rescrambled signal, providing said rescrambled signal to said external source.

In accordance with one aspect of the present the received data is a scrambling key encrypted using a public key associated with said smart card and wherein the step of generating said scrambling key comprises decrypting said encrypted scrambling key using a private key associated with said smart card, said private key being stored in said smart card.

In accordance with one aspect of the present invention, the scrambling key comprises a seed value and the step of scrambling the descrambled signal generating a random sequence in response to the seed value, and generating the rescrambled signal by exclusive ORing said random sequence and said descrambled signal.

In accordance with another aspect of the present invention, the received scrambled signal comprises video, audio and control packets and the seed value is generated, in the external source, in a unique manner in response to said video, audio and control packets.

In accordance with another aspect of the present invention, the smart card verifies the seed value by comparing the seed value to a subsequent seed value generated in the unique manner in response to the video. audio and control packets.

In accordance with yet another aspect of the present invention. the seed value is generated utilizing one of the hash of video, audio and control packets or by exclusive ORing said video, audio and control packets together.

In accordance with yet aspect of the present invention, a first seed value is generated in the smart card and the received data is a second seed value. The step of generating said scrambling key comprises generating said scrambling key in response to said first and second seed values.

In accordance with yet aspect of the present invention, a system for managing access between a service provider and a host device having a smart card coupled is provided. The host device performing the steps of: receiving a scrambled signal from the service provider, sending, to the smart card, a seed value generated in the host device and encrypted using a public key of the smart card, coupling the received signal to the smart card, and receiving from the smart card the rescrambled signal. The smart card has a means for access control processing, comprising means for generating a descrambling key in response to the received signal, means for descrambling the received signal using the descrambling key to generate a descrambled signal, means for decrypting the encrypted seed value using a private key of the smart card to provide the seed value, means for generating a random sequence in response to the seed value and means for scrambling the descrambled signal using the random sequence and the descrambled signal to generate a rescrambled signal.

These and other aspects of the invention will be explained with reference to a preferred embodiment of the invention shown in the accompanying Drawings.

DETAILED DESCRIPTION OF THE DRAWINGS

When a conditional access (CA) device (or a smart card (SC)) receives a transmitted or broadcast signal (i.e., a program or event) that is scrambled (or encrypted), the CA device may be used to descramble (or decrypt) the signal. The National Renewable Security Standard (NRSS) provides a means for implementing renewable security in connection with smart cards employed with digital consumer electronics (CE) devices, such as, digital television receivers (DTV), digital video cassette recorders (DVCR) and separate devices or "boxes" that may be located on top of, or coupled to, a television receiver. i.e., set-top boxes (STB). A potential problem with the NRSS architecture is that the audio/visual (A/V) stream is not scrambled when it leaves the smart card. This provides a point in which the security of the CA system could be breached because one could monitor and tap the output of the smart card and use a data capturing device to record all the plaintext data. The present invention provides an improvement to protect the connection between the smart card and the CE device. Such smart cards include ISO 7816 cards having a card body with a plurality of terminals arranged on a surface in compliance with National Renewable Security Standard (NRSS) Part A or PCMCIA cards complying with NRSS Part B.

Figure 1:
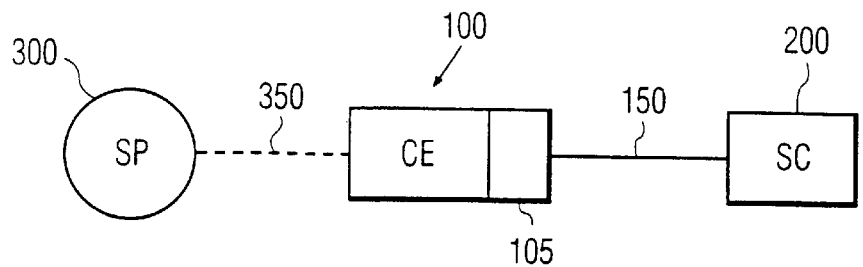
FIG. 1 is a block diagram of an exemplary implementation of a system for enhancing the security of the interface between a consumer electronic device and a renewable security device in accordance with the invention.
Figure 2:
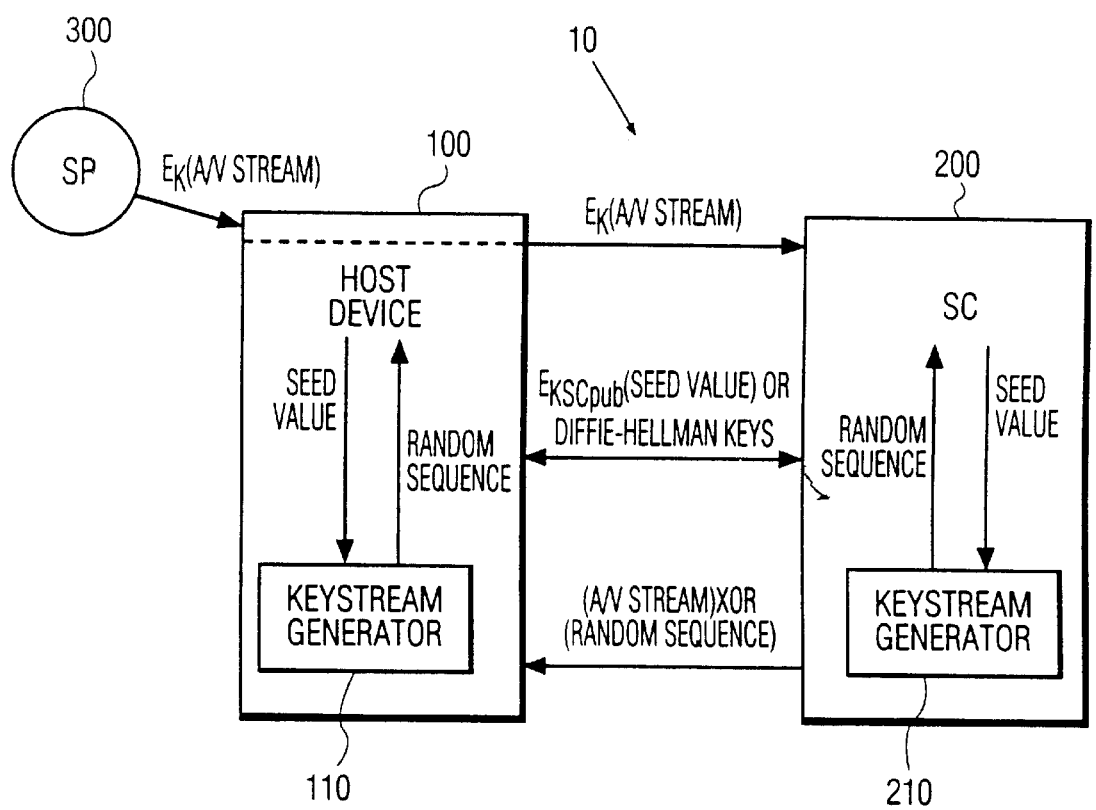
FIG. 2 is a scnematic block diagram illustrating the signal flow of FIG. 1.

In FIG. 1, a system 10 for protecting the A/V stream of CE device 100 which employs NRSS smart card (SC) 200 is depicted. Such CE or host devices 100 include DTVs, DVCRs or STBs. Smart Card 200 is inserted into, or coupled to, a smart card reader 105 included in, or coupled to, host device 100; bus 150, internal to host device 100, interconnects host device 100 and SC 200 thereby permitting the transfer of data therebetween. Host device 100 is connected to a cable, satellite or broadcast service provider (SP) 300 via a link 350. The protection system of the present invention will be described in relation to system 10 as shown in FIGS. 1 and 2.

For the protection of the NRSS interface (i.e., the return path), A/V data processing in accordance with this invention include rescrambling the plaintext A/V data in the smart card. A requirement of consumer electronic manufacturers for the design of a CA system is to avoid the permanent storage of any secrets in the host device. Thus, the rescrambling key cannot be exchanged using an architecture where a private or a shared secret key is embedded in the host. The rescrambling key should be dynamically established without modifying the present smart t card architecture drastically. A dynamic key is one that is generated on-the-fly in real-time and is not fixed. Periodic (for example, every ten seconds) generation of new keys is normally needed to increase the robustness against cryptanalytic attacks.

Two key establishment protocols can be considered for this purpose:
1) A key transport protocol (e.g., public-key encryption): One party creates the key to be shared, and securely sends it to the other.
2) A key agreement protocol (e.g., Diffie-Hellman): The shared key is derived by two parties as a function of data contributed by each of them.

The key that is shared between the smart card and the host can be used in a number of ways to scramble the A/V stream before it is sent back to the host. For example, block ciphers may be considered for rescrambling. Since the DES algorithm is typically used for descrambling the incoming An stream, it could be used for rescrambling the signal. However, such a complex cipher engine in the host device would increase the manufacturing cost and complexity.

Synchronous stream ciphers are appropriate for rescrambling. A synchronous stream cipher is one in which the key stream is generated independently of the plaintext and ciphertext messages. Although the design of most practical stream ciphers is centered around linear feedback shift registers (LFSRs) (because they are well-suited for hardware implementations, produce sequences with large periods and good statistical properties and are amenable for analysis), there is a variety of other approaches.

The key generator 110 can be initialized with the shared key to obtain the random sequence. The frequency of renewing the seed is an implementation dependent parameter. The seed will, in general, be different for each renewal, thus resulting in dissimilar random sequences for discouraging cryptanalytic attacks. The general architecture of such a system is shown in FIG. 2.

Particularly, this invention, in one embodiment, provides for the dynamic generation of a key within the host device 100 utilizing an RSA (Rivest, Shamir and Adelman) engine. This key is shared with SC 200 and is used to rescramble the audio/visual (A/V) stream prior to it leaving the SC 200. Both the host device 100 and SC 200 contain RSA engines for encryption and decryption. An RSA engine may be implemented using a co-processor (i.e. a microprocessor). Since the public key of the smart card is available to the host device as well as to the service providers, it can be used by the host to encrypt a scrambling key before it is sent to the smart card.

The protocol using the RSA public key system involves the encryption of the dynamic key in host device 100 using the public key of smart card 200. The encrypted dynamic key is transmitted to smart card 200 and is decrypted using the private key of the smart card. This is an asymmetric key system, wherein only public keys are stored in the STB or DTV or DVCR. That is, the device does not store or contain any secrets (i.e., private keys). The foundation of public-key cryptography is the use of two related keys, one public and one private; the private key being computationally unfeasible of being deduced from the public key which is publicly available. Anyone with a public key can encrypt a message but only the person or device having the associated and predetermined private key can decrypt it.

In another embodiment of the present invention, both host device 100 and SC 200 have Diffie-Hellman engines to generate a shared key. Neither host device 100 nor SC 200 can alone generate the key. A first seed value generated in SC 200 is sent to host device 100 and a second seed value generated in host device 100 is sent to SC 200. Together, host device 100 and SC 200 generate the shared key.

Both of the key establishment protocols are subject to attacks if the host device participating in the key generation is not authenticated. An improvement is possible by generating the shared seed as a function of the transport stream transmitted to the card in an initial time period. As the audio/video packets are scrambled, and the Entitlement Control Messages (ECMs) are encrypted, they can be used as functional arguments. This can provide implicit key authentication.

For example, if both host device 100 and smart card 200 have RSA engines, and the host has a copy of the card's public key, $K_{pubSC}$, the host can construct the seed using a function of the video, audio, and ECM packets:

Shared seed:(random number|f(A, V, ECM))

As an another example, if both host device 100 and smart card 200 have Diffie-Hellman engines and they exchange the keys $\alpha^x$ and $\alpha^x$, the exponent x can be constructed using a function of the video, audio and ECM packets:

$(\alpha^{random\ number}, \alpha^{f(A,\ V,\ ECM)})$, where x=(random number+f(A,V, ECM)

In both examples, the smart card 100 computes the same functional value independently and compares it with that sent by the host. This effectively provides host authentication, preventing the intruders from impersonating the host.

The function f=f(A, V, ECM) can be defined in a number of ways. Two possible definitions are:
1) f=hash (A, V, ECM)
2) f=A xor V xor ECM Note that these definitions may include more than three packets. The number and positions of the A, V, and ECM packets in the stream are also a part of the function definition.

A one-way hashing algorithm, such as MD5 developed by Ron Rivest or SHA-1 developed by the National Institute of Standards and Technology (NIST) and the National Security Agency (NSA) may be used to determine the hash function "f".

For more security, the seed needs to be renewed periodically. Renewal is possible by recomputing the function for each time interval. For example, the first packet encountered in each of the A, V, and ECM substreams in every 30 seconds can be used in generating a new key stream for scrambling. Alternatively, packets can be numbered for synchronization between the host and the card.

Generation of the shared seed as a function of the transport stream makes the attacks on the proposed key establishment protocols more difficult. This does not require additional cryptographic tools. As the transport stream is shared by the host and the card, it can be used with minimal computation to implicitly authenticate the host.

This invention provides protection against copying of copyrighted A/V streams in transmission to the host. The modified key establishment protocols can be used to prevent active attacks. Thus, if the key is defined to be a function of the MPEG-2 transport stream (i.e., service packets and ECMs), the hacker would also need to access the stream and extract the required data out of it.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

What is claimed is:

1. A method for protecting the output audio/visual stream of a smart card comprises the steps of:
    (a) receiving a scrambled signal from a source external to said smart card;
    (b) generating a descrambling key in response to said received signal;
    (c) descrambling said received signal using said descrambling key to generate a descrambled signal;
    (d) receiving data from said external source;
    (e) generating a scrambling key in response to said received data;
    (f) scrambling said descrambled signal using said scrambling key to generate a rescrambled signal; and,
    (g) providing said rescrambled signal to said external source.

2. The method of claim 1 wherein said received data is a scrambling key encrypted using a public key associated with said smart card and wherein the step of generating said scrambling key comprises decrypting said encrypted scrambling key using a private key associated with said smart card, said private key being stored in said smart card.

3. The method of claim 2 wherein said scrambling key comprises a seed value and wherein the step of scrambling said descrambled signal comprises the steps of:
    (a) generating a random sequence in response to said seed value; and
    (b) generating said rescrambled signal by exclusive ORing said random sequence and said descrambled signal.

4. The method of claim 3 wherein said received scrambled signal comprises video, audio and control packets and said seed value is generated, in said external source, in a unique manner in response to said video, audio and control packets.

5. The method of claim 4 wherein said smart card verifies said seed value by comparing said seed value to a subsequent seed value generated in said unique manner in response to said video, audio and control packets.

6. The method of claim 5 wherein said seed value is generated utilizing said hash of video, audio and control packets.

7. The method of claim 5 wherein said seed value is generated by exclusive ORing said video, audio and control packets together.

8. The method of claim 1 wherein said smart card has a card body having a plurality of terminals arranged on a surface of said card body in accordance with one of ISO 7816 and PCMCIA card standards.

9. The method of claim 1 further comprising the step of generating, in said smart card, a first seed value, and wherein said received data is a second seed value.

10. The method of claim 9 wherein the step of generating said scrambling key comprises generating said scrambling key in response to said first and second seed values.

11. The method of claim 10 wherein said scrambling key comprises a seed value and wherein the step of scrambling said descrambled signal comprises the steps of:
    (a) generating a random sequence in response to said seed value; and
    (b) generating said rescrambled signal by exclusive ORing said random sequence and said descrambled signal.

12. The method of claim 11 wherein said received scrambled signal comprises video, audio and control packets and said first and second seed values are generated in a unique manner in response to said video, audio and control packets.

13. The method of claim 10 wherein said first and second seed values are generated utilizing said hash of video, audio and control packets.

14. The combination of claim 10 wherein said first and second seed values are generated by exclusive ORing said video, audio and control packets together.

15. A system for managing access between a service provider and a host device having a smart card coupled thereto, said host device performing the steps of:
    (a) receiving a scrambled signal from said service provider;
    (b) sending, to said smart card, a seed value generated in said host device and encrypted using a public key of said smart card;
    (c) coupling said received signal to smart card, said smart card having a means for access control processing, said access control processing means comprising means for generating a descrambling key in response to said received signal, means for descrambling said received signal using said descrambling key to generate a descrambled signal, means for decrypting said encrypted seed value using a private key of said smart card to provide said seed value, means for generating a random sequence in response to said seed value and means for scrambling said descrambled signal using said random sequence and said descrambled signal to generate a rescrambled signal; and (d) receiving from said smart card said rescrambled signal.

16. The system of claim 15 wherein said public key is stored in said host device and said private key is stored in said smart card.

17. The system of claim 16 wherein said host device is one of a digital television, a digital video cassette recorder and a digital set-top box.

18. A system for managing access between a service provider and a host device having a smart card coupled thereto, said host device performing the steps of:

(a) receiving a scrambled signal from said service provider;

(b) sending, to said smart card, a second seed value;

(c) coupling said received signal to said smart card, said smart card having a means for access control processing, said access control processing means comprising means for generating a descrambling key in response to said received signal, means for descrambling said received signal using said descrambling key to generate a descrambled signal, means for generating a first seed value, means for generating a scrambling key in response to said first and second seed values, and means for scrambling said descrambled signal using said scrambling key to generate a rescrambled signal; and (d) receiving from said smart card said rescrambled signal.

19. The system of claim 18 wherein said host device is one of a digital television, a digital video cassette recorder and a digital set-top box.

* * * * *